Aug. 20, 1963　　　E. L. SWAINSON　　　3,101,462
LINEAR MOTION, SIGNAL-PRODUCING, MAGNETIC TRANSDUCER
Filed Aug. 25, 1961　　　　　　　　　　2 Sheets-Sheet 1

INVENTOR.
EDWARD L. SWAINSON
BY
Kenway, Jenney & Hildreth
ATTORNEYS

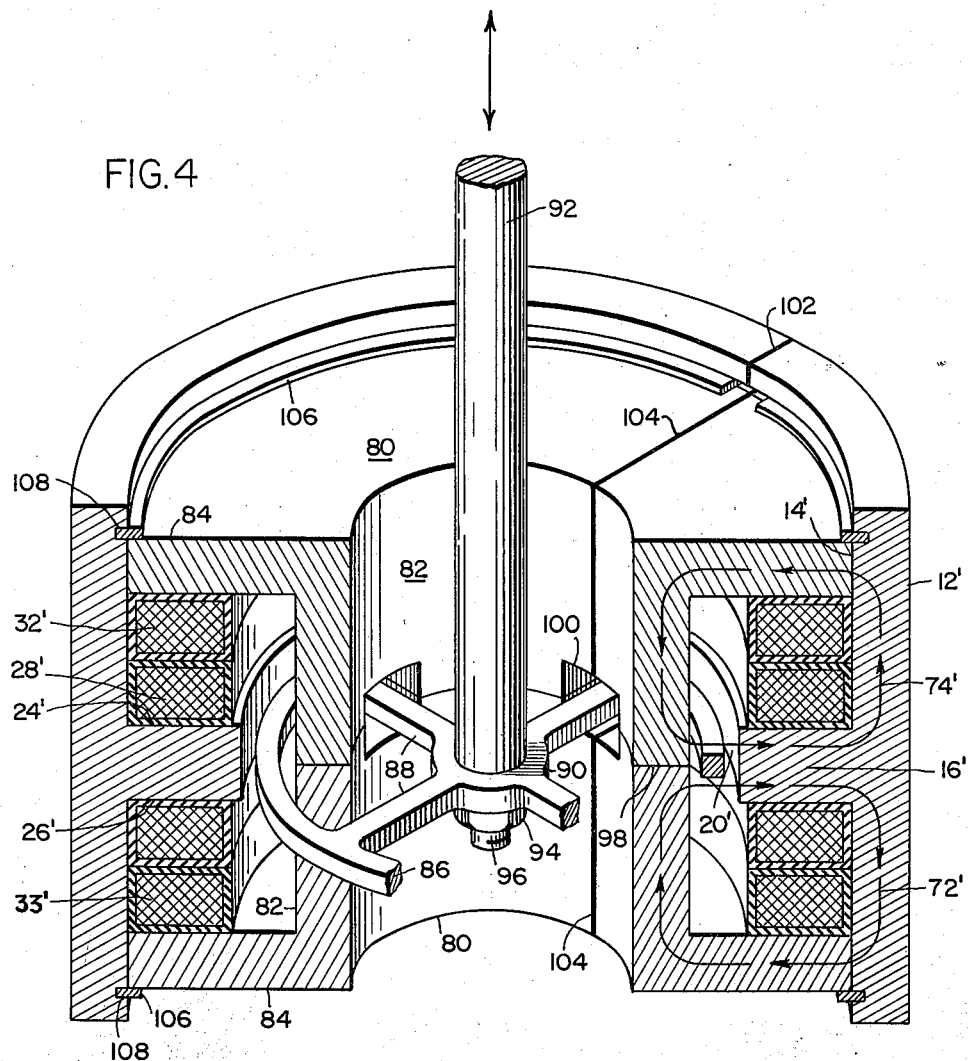

3,101,462
LINEAR MOTION, SIGNAL-PRODUCING, MAGNETIC TRANSDUCER

Edward L. Swainson, Newtonville, Mass., assignor to Northrop Corporation, Beverly Hills, Calif., a corporation of California
Filed Aug. 25, 1961, Ser. No. 133,848
4 Claims. (Cl. 336—75)

This invention relates to transducers for producing a signal for indicating the linear position of an element. The invention is more particularly directed to an improved transducer of the type in which a movable non-magnetic conductive shorted-turn armature varies the relative distribution of magnetic flux between two flux paths, to control the relative values of output voltage of secondary coils each positioned in one of the flux paths.

Such a system has previously been proposed, in which the armature comprises a conductive non-magnetic shorted turn interposed in an air gap of an "E-I" magnetic core structure, and in which a primary coil and a pair of series-connected secondary coils are arranged on three legs of the magnetic structure for the generation of opposed output voltages, which may be compared by any suitable indicating means. The shorted turn acts as a flux-gate whose position determines the relative distribution of flux in the magnetic circuits linking the primary coil to each of the secondary coils. Thus, movement of the shorted turn from a neutral position causes the output voltages of the secondary coils to differ, and the direction of movement is indicated by the sense of the voltage differential, while the extent of the movement is accurately indicated by the magnitude of this differential.

A system of this nature has the advantage, with respect to a system in which a movable magnetic armature is utilized to vary the reluctance of the magnetic structure coupling the two circuits, that there is a substantial magnetic reaction force to movement of a magnetic armature, which does not occur with a non-magnetic armature. The non-magnetic conductive shorted-turn armature is subject to circulating currents by the magnetic fields, and sets up a counter-flux which reduces the intensity of the flux linkages between the primary and each secondary coil, such that its position with respect to each of the two magnetic circuits varies the relative values of their output voltages in a linear relationship.

It is the primary object of the present invention to provide an improved construction for a linear motion transducer of the type in which a non-magnetic conductive shorted-turn armature is movably positioned in a common air gap of magnetic flux paths linking a primary coil with a pair of secondary coils. It is a further object of the invention to improve the efficiency of a linear motion transducer of the type just described. It is still a further object of the invention to afford a linear motion transducer of an improved construction which is compact, rugged, and resistant to mechanical injury of the parts. Further objects and advantages of the invention will become apparent as the following description proceeds.

Briefly stated, I may carry out my invention in preferred embodiments by providing a magnetic core structure of ferromagnetic material formed as a body of revolution internally forming a pair of enclosed annular coil slots axially spaced to receive first and second series-connected secondary coils, and defining first and second toroidal magnetic flux paths about the corresponding secondary coils. The core structure includes a circumferential internal flange axially interposed between the secondary coils for their support, and to form an annular air gap common to both flux paths. Within the annular air gap, I position a non-magnetic conductive ring armature, which in a neutral axial position equally divides the flux between the two paths for generation by the secondary coils of equal opposed output voltages. The armature is connected by means of a shaft, positioned exterior to the toroidal flux paths, to any movable apparatus whose position it is desired to determine, so that movement of the apparatus in either axial direction varies the relative flux distribution in the two paths to produce a net output voltage whose phase and magnitude bears a linear relationship to the direction and extent of the displacement of the apparatus from the neutral position. The use of a non-magnetic conductive ring armature arranged in this fashion affords a high degree of efficiency in the transducing function, so that accurate response is achieved. Furthermore, the enclosed construction protects the coil and armature structures against mechanical injury.

The core members may assume various forms within the broader aspects of the invention, but I prefer to utilize a unitary annulus as an outer core member for maximum structural integrity, and to provide further internal core members which may be inserted into the annulus following the assembly of the armature ring and coils therein. In a preferred embodiment, the core structure is made up of an annulus formed integrally with the aforementioned internal flange extending circumferentially about its internal surface intermediate its ends; and of further core members snugly received within the interior of the annulus to form circumferential flanges at the ends of the core, and an inner axial leg concentric with the outer annulus. In this construction, the primary and secondary coils are preformed and axially inserted from opposite ends of the annulus for abutment against opposite axial faces of the internal flange therein; the further members of the core structure are subsequently inserted and secured within the annulus to completely enclose the coils and armature within the core structure.

While the further core members may be formed in a variety of ways, I have found that two arrangements are particularly desirable from the standpoint of minimizing the number of parts and facilitating their assembly. In one of these forms, two further members are provided, one comprising a body of revolution of a T-shaped section taken on an axial plane, which forms a first circumferential flange at one end of the core and a solid inner axial leg, and the other of which comprises an annular plate member divided into arcuate segments to form the second circumferential flange at the opposite end of the core structure; the annular plate member receives the inner axial leg of the first member centrally to enclose the magnetic flux paths. In this embodiment, an armature-positioning shaft is connected with the armature ring by means of leg portions spaced circumferentially about the inner axial leg, and extending into the air gap through suitable openings in the radially-split faces of the segment of the plate member.

In another form, a pair of further core members are each formed with an annular cylindrical portion and with a circumferentially extending flange portion at one axial end thereof; these members are inserted from opposite ends of the outer annulus so that their cylindrical portions axially abut to form the inner axial leg of the core structure, and the flange portions internally engage the annulus to enclose the flux paths. In this case, the armature ring is connected by radial spokes to an armature-positioning shaft extending axially within the cylindrical portions of the further core members, and the cylindrical portions are formed with openings about their mutual abutment surfaces to receive the spokes for free axial movement of the armature ring within the air gap.

While the specification concludes with claims particularly pointing out the subject matter of the invention, it is believed that a clearer understanding may be derived from the following detailed description of preferred embodiments thereof, referring to the accompanying drawings, in which:

FIG. 4 is a view in cross-section and partially in perspective of a modified form of the transducer.

Figure 1:
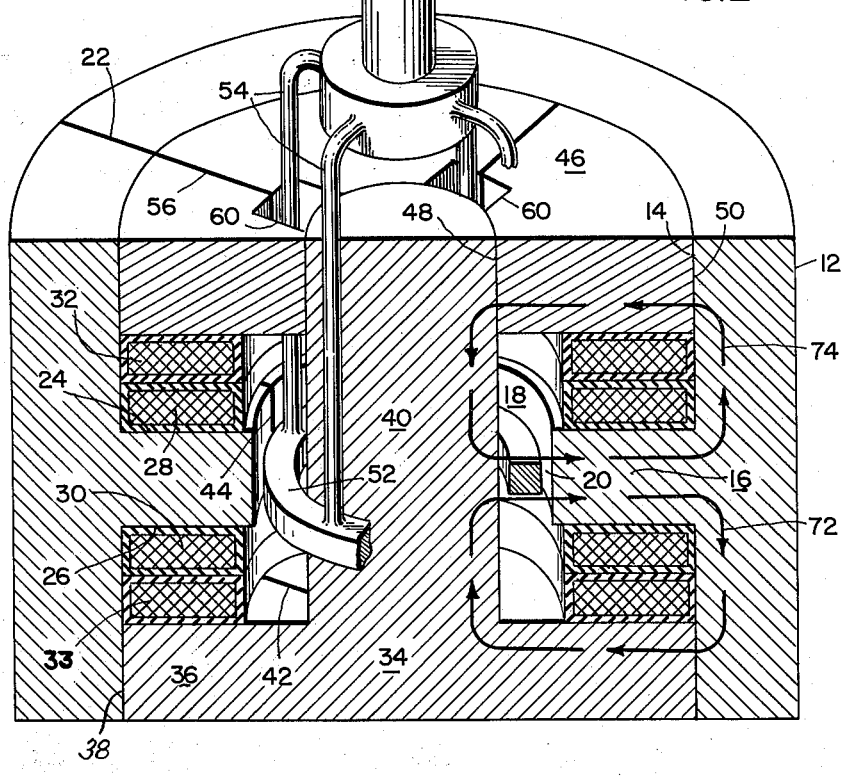
FIG. 1 is a view in cross-section and partially in perspective of a first embodiment of the improved linear motion transducer.
Figure 2:
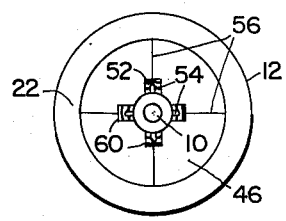
FIG. 2 is a top plan view.

Referring to FIGS. 1 and 2, the improved transducer serves to afford output voltages for indicating the direction and magnitude of displacement of an armature shaft 10 from a neutral position shown, along an axis indicated by the double arrow. The shaft may be of any desired material, and is connected to any apparatus whose linear displacement it is desired to determine. The improved transducer includes a magnetic core structure of ferromagnetic material, having an annulus 12 of cylindrical form. The annulus has integrally formed along an internal surface 14 thereof, intermediate its axial ends, a radial flange 16 extending circumferentially therein and terminating inwardly in a circular face 18 to define an annular air gap 20. The annulus 12 is radially split at 22 to prevent the establishment of circulating currents with consequent core losses. This slot may be filled with any suitable insulating material such as resin, paint, or cement, or the slot may remain open if desired, without affecting the structural integrity of the core.

The flange 16 forms opposed radial plane surfaces 24 and 26, which locate a pair of pre-formed and insulated toroidal primary coils 28 and 30, respectively. Axially overlying the primary coils are a pair of pre-formed and insulated toroidal secondary coils 32 and 33.

The coil slots defined by the annulus 12 are enclosed, and the core structure is completed, by further core members including a first member 34 formed as a body of revolution of a T-shaped cross-section taken on an axial plane, and including a circumferential flange 36 forming a first radial leg at one end of the core structure. The member 34 further includes a solid cylindrical portion 40 forming an inner axial leg of the core structure. This member is received in snugly slidable relation within the annulus 12, and is cemented or otherwise suitably secured thereto about a peripheral surface 38. The flange 36 is shown radially slotted at 42, in register with the radial slot 22, to further reduce circulating currents, and the flange 16 is shown slotted at 44 for the same purpose; the extension of the slot 22 radially inwardly in this manner is not essential to efficient operation of the transducer, although it contributes to some extent thereto.

The core structure is completed by a second ferromagnetic member 46 of annular plate-like form, slidably engaging the inner leg 40 in a central opening 48 thereof. The outer periphery 50 of the member 46 is cemented or otherwise secured to the interior surface 14 of the annulus 12, and is also secured in a similar fashion about the opening 48 to the inner leg 40.

Prior to the assembly of the member 46 in the core structure, a non-magnetic conductive ring armature 52 is inserted in the air gap 20, extending normally to the transducer axis. Connection of the ring armature with the shaft 10 is achieved by means of a plurality of legs 54 circumferentially spaced about the inner leg 40. To receive these legs freely, the member 46 is radially split as at 56 into a series of arcuate segments, and a plurality of openings 60 are recessed into the segments along the radially split surfaces. The segments of the member 46 are structurally united after their assembly in the annulus by suitable means, such as resin or cement. It will be understood that it is necessary to insulate only one of the radial splits in order to prevent circulating currents from being induced in this member.

Figure 3:
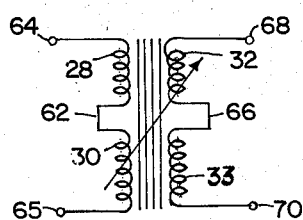
FIG. 3 is a schematic view illustrating the electrical connection of coil means of the transducer.

The primary coils 28 and 30 are connected in series relation, as shown in FIG. 3, by means of a lead 62 between suitable alternating current input terminals 64 and 65. The secondary coils 32 and 33 are connected in series-opposing relation by means of a lead 66 between output terminals 68 and 70, for connection to any desired differential output voltage-indicating means, to a servo-mechanism for actuating the apparatus whose position is determined by the transducer to a neutral position, or to any other desired means for utilizing the position signal. The ring armature 52 affords a variable coupling between each primary coil and its corresponding secondary coil as schematically illustrated, such that axial movement of the armature produces a differential unbalance in the output voltages of the secondary coils to indicate the extent and direction of displacement of the armature shaft from the neutral position.

The primary coils establish magnetic flux paths 72 and 74, as indicated by the arrows in FIG. 1, which are distributed in toroidal forms about the core structure. The flux paths share the air gap 20 and the flange 16 in common, passing in aiding relationship through these portions of the core structure. Circulating currents induced by the flux in the armature ring 52 produce a magnetic counter-flux, which reduces the intensity of the flux affecting either of the secondary coils to an equal extent when the armature is in the neutral position shown. However, if the armature is displaced in either axial direction as indicated by the double arrow, the intensity of the flux affecting that secondary coil toward which the armature is moved is reduced in direct proportion to the extent of the movement, and a differential in the output voltages is produced. Since the flux lines are equally axially distributed over the surface 18 defining the air gap, the differential in output voltage is directly proportional to the extent of movement of the armature. However, the surface 18 should be of sufficient axial length to accommodate the full range of movement of the shaft 10, since the relationship becomes non-linear when the armature ring passes the limits of this surface.

Referring to FIG. 4, a modified embodiment is shown in which the further core members are somewhat differently formed and assembled. Parts similar to those of the foregoing embodiment are similarly numbered, with prime superscripts. A pair of internal core members 80 are provided, each of which includes an annular cylindrical portion 82 terminating axially in a circumferentially extending radial flange 84. A non-magnetic conductive armature ring 86 is integrally formed with radial spokes 88 connected to an inner ring 90, and is drivingly connected with a non-magnetic armature shaft 92 by means of a nut 94 engaging a threaded end 96 of the shaft. Following the insertion of the armature ring into the air gap 20', the core members 80 are inserted from opposite axial ends of the annulus 12', abutting at 98 to form the inner axial leg of the flux paths 72' and 74'. The axially-abutting ends of the core members 80 are recessed to form openings 100 receiving the spokes 88 for free axial movement of the armature. In this embodiment, the annulus 12' is radially split at 102, and this split is continued through the core members 80 at 104, to prevent the induction of circulating currents in the core. The assembly is retained by means of snap rings 106 received in annular grooves 108 formed about opposite axial ends of the internal surface 14' of the annulus.

It will be apparent that the further core members may be segmented in various fashions for insertion in the annulus after the coils and the armature have been assembled therewith. Therefore the foregoing embodiments, although preferred, do not represent limitations of the true scope of the invention, which is defined in the appended claims. The improved linear motion transducer, as will be apparent from the foregoing description, affords a compact and efficient construction which is structurally rugged and protects the coil and armature elements from mechanical injury. The use of a non-magnetic conductive armature, as opposed to the use of a portion of the magnetic core structure as a movable element for the determination of linear displacement, produces a negligible reaction force against its movement through the flux paths of the transducer, while it affords an efficient translation of the movement into an output signal which is a convenient and accurate measure of both the direction and extent of such movement.

What I claim is:

1. A linear motion transducer comprising, in combination, a cylindrical magnetic core structure defining therein a pair of axially-spaced toroidal flux paths closed with a common annular air gap, said core structure further defining a pair of annular coil slots each positioned within one of said closed toroidal flux paths and a stationary return leg interior to said air gap, primary coil means arranged for energization to establish flows of magnetic flux within said paths in aiding relation across said air gap, a pair of secondary coils each lying in one of said coil slots and connected in series-opposed relation for generating output voltages, and a non-magnetic conductive ring armature arranged in said air gap and exterior to said return leg and extending normally to the major axis of said core structure, an armature-positioning shaft positioned exterior to said flux paths, and means for connecting said armature-positioning shaft to said ring armature for movement therewith, said ring armature being movable with said armature-positioning shaft along said axis to vary the flux linkages of said secondary coils with said primary coil means and thus control the relative values of said output voltages in response to the axial position of said ring armature.

2. A linear motion transducer as recited in claim 1, in which said cylindrical core structure is formed with a plurality of circumferentially-spaced-apart openings, and said connecting means comprise a plurality of legs extending with a radial component of direction from said shaft, each through one of said openings, for connection with said ring armature.

3. A linear motion transducer as recited in claim 2, in which said shaft terminates in axially-spaced relation to said cylindrical core structure, said circumferentially-spaced-apart openings extending axially from an axial end of said core structure into communication with said air gap, and said legs extending radially and axially from said shaft to said ring armature.

4. A linear motion transducer as recited in claim 2, in which said return leg is annular and defines a central opening extending axially within said cylindrical core structure, said shaft extending within said central opening, said circumferentially-spaced-apart openings extending radially through said return leg from said central opening to said air gap, and said legs extending radially from said shaft to said ring armature.

References Cited in the file of this patent

UNITED STATES PATENTS

| 2,020,796 | Norris | Nov. 12, 1935 |
| 2,430,757 | Conrad | Nov. 11, 1947 |
| 2,494,579 | Pimlott | Jan. 17, 1950 |